US012576565B1

(12) United States Patent
Lamm et al.

(10) Patent No.: US 12,576,565 B1
(45) Date of Patent: Mar. 17, 2026

(54) SYSTEM AND METHOD OF INJECTING ACCURATE QUANTITIES OF FOAM INTO CAVITIES WITHOUT POSITIVE DISPLACEMENT FLOW METERS OR FLOW RATE CONTROL APPARATUS

(71) Applicant: Building Envelope Materials LLC, Lexington, MA (US)

(72) Inventors: Douglas W. Lamm, Lexington, MA (US); Alexander C. Bell, Madbury, NH (US)

(73) Assignee: Building Envelope Materials LLC, Lexington, MA (US)

( * ) Notice: Subject to any disclaimer, the term of this patent is extended or adjusted under 35 U.S.C. 154(b) by 0 days.

(21) Appl. No.: 19/317,688

(22) Filed: Sep. 3, 2025

Related U.S. Application Data

(60) Provisional application No. 63/715,785, filed on Nov. 4, 2024.

(51) Int. Cl.
| | |
|---|---|
| B29C 44/18 | (2006.01) |
| B29C 44/38 | (2006.01) |
| B29C 44/60 | (2006.01) |
| B29L 31/10 | (2006.01) |
| E04B 1/76 | (2006.01) |

(52) U.S. Cl.
CPC .............. B29C 44/18 (2013.01); B29C 44/38 (2013.01); B29C 44/60 (2013.01); E04B

*1/7604* (2013.01); *B29K 2995/0015* (2013.01); *B29L 2031/10* (2013.01)

(58) Field of Classification Search
CPC ..... B29C 44/60; B29C 44/38; B29C 48/0012; B29C 44/348; B29C 44/3403; B29C 44/027; B29C 44/025; B29C 44/022; B29C 44/18
See application file for complete search history.

(56) References Cited

U.S. PATENT DOCUMENTS

2017/0080614 A1* 3/2017 Lamm ................... E04B 1/7604

* cited by examiner

*Primary Examiner* — Stella K Yi
(74) *Attorney, Agent, or Firm* — Maine Cernota & Curran

(57) ABSTRACT

A cavity is filled with a foam-in-place insulation by a self-contained dispensing system for which precursor vessel pressures and precursor flow rates decrease as the precursors are dispensed. Flow rate functions for the precursors are pre-calibrated as a function of vessel pressures and/or related parameters such as vessel weights, precursor levels in the vessels, and total volumes dispensed. The cavity is filled by at least one shot of the precursors, each shot comprising a plurality of counts that are announced to a user during the shot. The length of each count and/or the number of counts is/are adjusted according to the flow rate functions in compensation for the decreasing vessel pressures. Embodiments further adjust the count durations for reduced start-up flow at the start of a shot and/or extended flow at the end of a shot, due to mechanical properties and/or user reaction times.

16 Claims, 9 Drawing Sheets

SYSTEM AND METHOD OF INJECTING ACCURATE QUANTITIES OF FOAM INTO CAVITIES WITHOUT POSITIVE DISPLACEMENT FLOW METERS OR FLOW RATE CONTROL APPARATUS

RELATED APPLICATIONS

This application claims the benefit of U.S. Provisional Application No. 63/715,785, filed Nov. 4, 2024, which is herein incorporated by reference in its entirety for all purposes.

FIELD OF THE INVENTION

The invention relates to methods and apparatus useful for application of insulation materials, and more particularly, to methods and apparatus useful for dispensing measured quantities of insulation materials into enclosed cavities.

BACKGROUND OF THE INVENTION

It is often desirable to increase the thermal insulation of existing buildings, which can reduce their energy usage by as much as 50%. However, most walls, and most ceiling structures, are made up primarily of fully or partially enclosed spaces bounded by wall panels, and by framing members such as rafters, studs, and joists. These enclosed spaces, referred to herein generically as "cavities," are often not directly accessible, and may be poorly insulated.

One approach is to inject insulation into the cavities through very small holes that are easily repaired afterward. According to this approach, small, temporary holes are made in either the interior or exterior cavity wall panels, and an insulating material is dispensed or "injected" into the cavities. While there are many different insulating materials that can be injected in this way, it is often desirable, especially for minimally invasive insulation projects, to inject two-component "foam-in-place" insulation into the cavities. According to this approach, at least two components, or "precursors," of the foam are mixed in controlled amounts and with a controlled ratio and are injected into the cavity. The precursor mixing can take place immediately before and/or after entry into the cavity. Once inside of the cavity, the two precursors fully react with each other, and expand to form the foam insulation.

One example is a "pour" foam, which is formed by mixing two liquid precursors together. In some applications, one or more of the liquid precursors contains gaseous or liquid blowing agents, surfactants, catalysts, flame retardants, and/or other components. A common choice is polyurethane foam, which can be formed by a two-component reaction of isocyanate with polyol resin, which are mixed near the tip of a dispensing "gun" just before injection into a cavity. It should be noted that the term "pour foam" is used herein generically to refer to any foam that is formed by mixing two liquid precursors with each other, either immediately before or immediately after they are injected into a building cavity, whereupon the precursors react with each other to produce the foam.

Installation of a pour foam into existing cavities through very small holes requires that the dispensed quantity of the mixed precursors must be very accurately controlled. After dispensing, pour foams with gaseous blowing agents often expand 5 times the dispensed volume of liquid precursor. Pour foams with liquid blowing agents can expand 30 to 100 times the volume of liquid precursor. On the one hand, the cavity must be entirely filled without any voids. On the other hand, if too large a quantity of the precursors is injected all at once into a single hole, the precursor mixture that is injected near the end of the shot will be constrained from expanding outward from the hole within the cavity, and instead may apply excessive pressure to the cavity walls, such that the walls bow out, or completely detach from the framing members. This undesirable outcome is referred to herein generically as "wall blowout."

To minimize risk of wall blowout, a plurality of "intermittent shots" of the precursors can be dispensed into the cavity through a plurality of spaced apart holes. The term "intermittent" shot is used herein to refer to any shot that does not completely fill a cavity or building structure, such that a plurality of intermittent shots are required to fill the cavity or building structure. Intermittent shots can be either body shots or finishing shots. According to this nomenclature, the filling of a cavity may require one or more body shots having equal dispensing volumes, followed by a finishing shot having a reduced dispensing volume that will complete the filling of the cavity with foam.

According to this approach, the foam is allowed to form and expand after each intermittent shot, before the next intermittent shot is applied into the cavity through a different hole, thereby reducing the pressure that is applied internally to the walls of the cavity.

To minimize the number of holes in a wall, it is desirable to predetermine a maximum volume of foam that can be dispensed in each intermittent shot without risking wall blowout. This volume of foam is referred to herein as a pre-determined "dispensed volume requirement." In many cases, the wall cavities are rectangular, being much taller than they are wide. In such cases, it is often possible for the foam that is formed by each intermittent shot to extend across substantially the entire width of the cavity. The dispensed volume requirement in such cases is typically expressed in terms of the height of each cavity fill. For example, in a 2-foot by 8-foot cavity, it might be possible for the foam resulting from each intermittent shot to extend across the entire two foot width of the cavity, while extending vertically to a maximum height of four feet, without significant risk of wall blowout. In this example, filling the cavity will require two intermittent shots. Since these two intermittent shots will precisely fill the cavity, a finishing shot will not be needed.

As the dimensions and geometry of cavities within a building can vary significantly, the dispensed volume requirement will also vary. As is described in U.S. patent application Ser. No. 15/251,783, filed on Aug. 30, 2016, incorporated herein by reference in its entirety for all purposes, the dispensed volume requirement can be predetermined using a process called "in-wall metering." According to this approach, a known quantity of precursor is introduced into a cavity of known volume. The dimensions of the resulting foam within the cavity are then measured using, for example, an infrared camera. From this measurement, a "fill rate" is calculated. Assuming a constant precursor flow rate, the fill rate can then be used to calculate the pre-determined dispensed volume requirement for cavities of different dimensions and geometries.

For instance, assuming constant precursor flow rates, if the fill rate for a cavity with a width of 16" is one inch of height per second of dispensed precursor and the dispensed volume requirement is 28" of height, then foam would be injected for 28 seconds. If a second cavity is half as wide, or 8" wide", the same fill rate would indicate a dispense time that is half as long, or a dispense time of 14 seconds.

Rather than interrupt a series of shots with calculations of dispense times for each cavity, it is much more efficient to calculate the shot times for all of the foam injections, and then to fill all of the cavities in an uninterrupted series of intermittent shots. Accordingly, before a user begins dispensing precursor, it is often desirable to mark the locations of the intermittent injections, and to associate a label with each marked location that indicates the shot time for the injection.

At the job site, the precursors of a multi-component foam are typically stored in drums or pressure vessels, which are referred to herein generically as "precursor vessels." The flow of precursor from a precursor vessel through a hose to a dispensing gun can be propelled by pressurized gases (typically air or nitrogen) within the precursor vessels. These systems usually use gaseous blowing agents and are often referred to as "low pressure" dispensing systems, because the gas pressures are typically less than 300 psi. In some low-pressure systems, the pressure within the precursor vessel can be controlled by external compressed gas reservoirs or compressors that are in direct fluid communication with the precursor vessel.

The flow of precursor from precursor vessel dispensing gun can also be controlled and propelled by drum pumps and a "volumetric proportioner". The volumetric proportioner controls the mixing ratio of the two precursor components and then pumps the precursors through the hoses and out the dispensing gun. These dispensing systems usually use liquid blowing agents and are often referred to as "high pressure" dispensing systems because the system pressure often exceeds 2000 psi.

Because these high-pressure and low-pressure dispensing systems are attached to external compressors or compressed gas cylinders, the flow rates of the precursors can be held constant. High pressure systems achieve constant flow rates through modulation of pump pressures and system temperatures. Low pressure systems attached to compressors or compressed gas cylinders achieve constant flow rates through the use of regulators that maintain a constant gas pressure in each precursor vessel as the precursors are dispensed. This allows the shot times to be easily calculated using the in-wall metering process as described above. In these systems, a given shot time at a given pressure always produces a given quantity of precursor. For example, a 5 second shot at 200 psi may always produce 80 grams of precursor.

However, high-pressure and low-pressure dispensing systems that are attached to external compressors or compressed gas cylinders suffer from significant problems when used to inject foam into buildings. As described above, high pressure systems typically use precursors with liquid blowing agents. Liquid blowing agents can cause precursor to seep into the interface between framing members prior to expansion. Also, precursors with liquid blowing agents expand 30 to 100 times their dispensed volume. Both factors can cause excessive pressure to build on cavity walls and can significantly increase blowout risk.

High pressure systems suffer from other problems including:

most high pressure proportioners are not mobile, but instead reside inside a box truck stationed outside of a building, with the precursors being conveyed to the dispensing gun through long hoses. In large buildings in urban areas, box trucks often can't be parked such that hoses can reach into every part of the building;

in colder weather, precursor stored outside in a box truck can freeze and become unusable;

high pressure systems use loud compressors that annoy building occupants;

most proportioners can only service one injection technician at a time, greatly limiting throughput; and high pressure dispense systems are highly complex. They are highly expensive to purchase, often fail due to crystallization of isocyanates and incur significant maintenance and repair costs.

Low pressure dispensing systems attached to compressors or compressed gas cylinders typically use gaseous blowing agents which only expand 3 to 5 times their dispensed volume, and thus are much less likely to blow out walls than high pressure systems. However, these systems suffer many of the same problems as high-pressure systems, as well as additional problems including:

if the compressors and/or compressed gas cylinders are mobile, and are brought inside of buildings, they are heavy and bulky, and compressor noise can annoy building occupants;

if compressed gas cylinders are used, they require an additional source of material supply.

These and other problems associated with low pressure systems supplied by compressors or gas cylinders can be avoided by relying instead on a self-contained low-pressure system that uses small, mobile, pressurized precursor vessels which are initially pressurized, but are not pressure regulated by external compressors, compressed gas supplies, proportioners, pumps or other external apparatus. These systems are often referred to as "kit foam" systems when the precursor vessels are disposable. However, refillable precursor vessels can also be used in self-contained systems.

This self-contained approach has many advantages including:

gaseous rather than liquid blowing agents are typically used, which greatly reduces blowout risk;

precursor vessels can be easily moved from place-to-place within the building;

parking large box trucks in urban areas is not required;

operating the apparatus generates very little noise;

the apparatus is highly reliable, due to the greatly reduced number of parts that are in contact with isocyanate;

the apparatus is relatively inexpensive to purchase;

the apparatus is simple to operate, such that technicians are quickly trained;

multiple technicians can work in parallel, thereby reducing the installation time of the foam; and precursors can be stored and temperature conditioned within the building during cold weather.

While offering many advantages, these small, mobile, self-contained pressurized precursor vessels suffer from variable precursor flow rates, and, as a result, an inability to accurately dispense a pre-determined dispensed volume requirement during an intermittent shot. Because the precursor vessels are not pressure regulated, the precursor flow rates from the local precursor vessels will decrease as the precursors are dispensed, and the initial pressures within the vessels are consequently reduced. For instance, under an initial pressure, the precursor flow rates might be 0.5 lbs/second but when the precursor vessel is half empty the precursor flow rates might be 0.25 lbs/second.

In many situations, "lag time" creates an even more significant variable flow rate problem. This lag time arises due to several factors. For example, at the beginning of the shot, time is required for the user to react to the command to start the shot and to fully depress the trigger on the dispensing gun. Also, an initial acceleration time is required after the trigger is depressed, during which the precursor flow rate rises to its equilibrium value. This acceleration time is primarily dependent on the viscosity of the precursor and the flow resistance of the hose. Similarly, at the end of the shot, time is required for the user to react to the command to end the shot. Also, at the end of the shot, residual precursor, under residual pressure in the dispensing gun, mixer and needle, will continue to fill the cavity, even after the trigger is released. Precursor dispensed during these lag times can account for 50% or more of the volume of dispensed precursor in a short intermittent shot or in a shot made at high pressure.

These problems of reduced pressures within the precursor vessels and lag time errors can be partially mitigated by using positive displacement flow meters. Positive displacement flow meters, also known as "totalizing systems," are in direct contact with the precursor fluids and measure the total quantity of precursor flow over a given time. As such, they can account for variable flow rates. As the pressure is reduced within the precursor vessel and the flow rate slows, the positive displacement flow meter will indicate that shot time should be increased in compensation. For instance, if the precursor flow rate is 0.5 lbs/second when the precursor vessel is full and 0.25 lbs/second when the precursor vessel is half full, the positive displacement flow meter can indicate that the shot time should be doubled when half full. Similarly, the positive displacement flow meter can partially compensate for the lag time effects by increasing or decreasing the shot time—though it should be noted that positive displacement flow meters do not entirely mitigate the lag time problem, since they cannot account for the portion of lag time due to user delay or due to residual precursor and pressure within the dispensing gun.

Changes in the flow rate can also be partially mitigated by manual or automatic adjustment of flow control valves. For instance, some flow control valves are designed to provide a constant flow rate independent of fluid pressure. Like positive displacement flow meters, flow control valves only partially compensate for lag time issues, since they cannot account for the portion of lag time that is due to user delay and/or due to residual precursor and pressure within the dispensing gun.

Additionally, both positive displacement flow meters and flow control valves are in direct contact with the precursor fluid, and thus suffer from problems due to the tendency of one or both precursors to form hardened crystals, which can cause positive displacement flow meters and flow control valves to fail frequently due to clogging. For instance, gears within a positive displacement flow meter can stop spinning. These equipment failures can significantly disrupt workflow. A much more significant and frequent problem that arises due to hardened isocyanate crystals is dispensing inaccuracy, whereby the system appears to be working correctly, but is in fact providing inaccurate flow rates because the crystals are only partially jamming the system. For example, unbeknownst to the user, a positive displacement flow meter might indicate a flow rate of 0.2 lbs/second, when the actual flow rate is 0.5 lbs/second. This can cause the user to overfill the cavity, which can lead to a wall blowout.

Ultrasonic and other types of non-contact flow meters avoid clogging. However non-contact flow meters only accurately measure flow rates in a steady state flow or after the precursor flow reaches its equilibrium value, and are incapable of accurate measurement during short intermittent shots and/or shots at high pressures because they cannot measure the change in flow rates during lag time events.

What is needed therefore is an insulation foam dispensing system that is localized, self-contained, and easily moved between injection sites within a building, and that provides reliable, and quantitatively accurate filling of cavities for shots of any length, without relying on positive displacement flow meters, flow control valves, or any external apparatus capable of modifying or regulating the pressures or flow rates within the precursor vessels.

SUMMARY OF THE INVENTION

The present invention is an insulation foam dispensing method and apparatus, wherein the apparatus is localized, self-contained, and easily moved between injection sites within a building, and wherein the disclosed method and apparatus provide reliable, and quantitatively accurate filling of cavities for shots of any length, without relying on positive displacement flow meters, flow control valves, or any external apparatus capable of modifying or regulating the pressures or flow rates within the precursor vessels.

According to the present invention, the disclosed foam injection system comprises at least one precursor vessel, at least one hose, and a cavity panel injection device, referred to herein as a "dispensing gun." It will be noted that the term "dispensing gun" refers generically herein to any device, or arrangement of devices, that receives one or more precursors from the precursor vessels and hoses, mixes the precursors if needed, and injects them into a cavity.

Each precursor vessel is prepared with an initial quantity of a corresponding precursor, and is charged with an "initial pressure" of a gas that is present above the precursor, but is not subsequently in fluid communication with any apparatus capable of modifying the internal gas pressure. Nor are the precursor vessels in fluid communication with any fluid flow control valves or any other fluid flow system capable of modulating flow rate, other than on/off valves. If the precursor vessels are disposable, these systems are commonly referred to as "kit foam." Refillable pressurized precursor vessels can also be used.

In embodiments, the system includes input devices capable of monitoring system parameters, which can include pressure sensors that directly measure the pressures within the precursor vessels and hoses, level sensors that measure precursor levels within the precursor vessels, and/or scales that weigh the precursor vessels. Some embodiments further include temperature sensors that monitor the temperatures of the precursors and/or precursor vessels. However, positive displacement flow meters are not included in the disclosed system.

Readings made by these monitoring system components can be presented visually to a user, and/or communicated to a controller or other computing device through wired connections, wireless connections or visually to the user.

In embodiments, the computing device is capable of receiving monitored system parameters, performing calculations on the monitored system parameters, and providing output signals to other system components. The computing device can be a general-purpose computing device, such as a smartphone or laptop, or the computing device can be dedicated to the disclosed apparatus. In various embodiments, information and/or prompts are presented to the user by the computing device itself, or by another device that can be physically separated from the computing device and configured to receive outputs from the computing device, delivered through wired, wireless or manual means. The information and/or prompts can be delivered to the user via a visual display and/or audio system. The audio system can present information to the user as comprehensible speech.

SUMMARY OF THE DISCLOSED METHOD

Because the disclosed system is not in fluid communication with any device that is capable of modulating the precursor vessel pressures, or otherwise modulating the precursor flow rates, the pressures within the precursor vessels will drop, and the resultant precursor flow rates will also drop, as the precursors are dispensed and the gas volumes within the precursor vessels consequently increase.

If intermittent shots are used, this will also increase the variability of the precursor flow rates due to lag times at the beginnings and ends of the shots.

According to the present invention, certain commonly used methods of monitoring variable flow rates, such as positive displacement flow meters in direct communication with the fluid, are not employed. Rather, accurate mathematical relationships are pre-established between precursor flow rates and at least one observable system parameter. Once this relationship is established, the flow rate for each injection can be predicted by monitoring the system parameter before and/or during filling of a cavity, thereby enabling the foam to be safely injected into the cavity without risking under-filling or wall blowout.

In embodiments, the precursor flow rates will depend primarily on the internal gas pressures within the precursor vessels. In some embodiments, the flow rate may also be affected by temperature fluctuations, while in other embodiments temperature fluctuations can be ignored.

In various embodiments, the gas pressure within each pressure vessel is directly monitored as the system parameter, for example using pressure gauges. In other embodiments, the expected precursor flow rates are estimated according to measurements of one or more other, "secondary" system parameters. These can include changes in the weight of the vessel, changes in an observable precursor level in the vessel, and/or calculation of an aggregate quantity of precursor that has been dispensed from the vessel.

The duration of each shot is controlled by implementing a process that is characterized by count parameters such as the total number of counts in a shot, referred to herein as the shot count, and a count duration. The count is presented to a user who actuates each shot, for example by verbally and/or visually presenting the count.

In some embodiments, an estimated average precursor flow rate is calculated at the beginning of each series of intermittent shots, and is used to determine the count parameters that will apply during the entire series of intermittent shots. In other embodiments, the calculation is repeatedly or continuously performed during each series of intermittent shots, and the count is adjusted accordingly.

In some embodiments, lag times are ignored. In other embodiments, lag times are predetermined as a function of internal pressure in the precursor vessel, and the count parameters are adjusted accordingly.

While it may appear that the number of calculations required of the user is onerous, all calculations are typically performed by a programmed computing device based on mathematical parameter relationships that have been predetermined in the lab and will normally not require subsequent revision for a given apparatus. At most, the user in the field need only manually enter two inputs into the program before starting a series of intermittent shots: which are the system parameter setting and the cavity width. In embodiments, the system parameter is automatically monitored and supplied to the computing device, such that the user only needs to enter the cavity width. Finishing shots will only require the user to manually provide one additional input, which is the required fill height for the finishing shot.

Definition of Terms

The disclosed invention uses several related terms with distinct meanings. As an understanding of the distinction between these terms is important to an understanding of the invention, the terms are defined herein as follows:

Shot. A single dispensing of foam precursors, characterized by a user pulling and releasing a trigger on a dispense gun, or otherwise actuating the dispensing gun, thereby starting and stopping a flow of the precursors.

Intermittent Shot(s). A shot or series of shots used to fill a cavity or multiple cavities. An intermittent shot includes variable precursor flow rates due to lag times at the beginning and ending of a shot.

Steady State Shot Portion. That portion of an intermittent shot characterized by a constant precursor flow rate. The steady state portion of a shot does not include any variable flow that might occur at the beginning and/or ending of a shot due to lag times.

Shot Number. The number of intermittent shots, for example "5 shots"

Shot Time. The total elapsed time for a single shot during which the dispensing gun is actuated.

Quantity. Because the resulting foam density for a given choice of precursors, when the precursors are mixed in the specified ratio, is always known a priori, precursor weight can always be converted to foam volume, and vice versa. The term "quantity" as used herein refers generically to both the precursor weight and the resulting foam volume, unless otherwise required by context.

Count. The term "count" is used herein to refer to a time segment of a shot during which a predetermined quantity of precursor or resulting foam is dispensed. For example, if 0.125 lbs of precursor is dispensed during one count, then 0.25 lbs of the precursor will be dispensed during two counts. Or, if one count results in 0.06 cubic feet of foam, then two counts will result in 0.12 cubic feet of foam. Shots are sometimes referred to herein in terms of their number of included counts. For example, a shot having a shot time of five counts is referred to herein as a five-count shot.

Starting Lag. A lag time that occurs at the beginning of a shot during which the flow rate of a precursor has not yet reached its equilibrium value. A starting lag can be due, for example, to a finite reaction time before a user actuates a dispensing gun, and/or a precursor fluid acceleration time that occurs once the dispensing gun is actuated.

Ending Lag. A lag time at the end of a shot during which the flow rate of a precursor has fallen below its equilibrium value, but has not yet entirely ceased. An ending lag can be due, for example, to a finite reaction time before a user ceases to actuate a dispensing gun, and/or a precursor fluid deceleration time that occurs once actuation of the dispensing gun has ceased, for example due to residual gas pressure and precursor that is remains present in the dispensing gun immediately after actuation of the dispensing gun ceases.

Lagged Count. The net time difference between the starting lag and the ending lag of a shot. For example, if the trigger pull delay is 0.4 seconds, the precursor acceleration time is 0.3 seconds, the trigger release delay is 0.1 seconds, and the precursor deceleration time is 0.2 seconds, then the lagged count will be 0.4+0.3−0.1−0.2=0.4 seconds.

Count duration. The duration of each of the counts during a shot. In embodiments, the shot count and/or the count duration is/are extended as successive shots are made in compensation for the lower precursor flow rates that result from the reduced pressure in the precursor vessels as the precursors are expended.

Count Speaking Time. This term is relevant to embodiments in which the beginning of each count during a shot is announced audibly to the user as a series of recited numbers, referred to herein as an audible count. The count speaking time is the time interval required to speak a number during an audible count. For example, the audible pronouncing by the system of 'twenty-two' may requires 0.9 seconds, while the audible pronouncing by the system of 'three' may require only 0.4 seconds.

Count Pause Time. During an audible count, the time between the end of one recited number and the beginning of the next recited number. In general, the sum of the count speaking time and the count pause time will be equal to the count duration. Both may vary during a shot as the recited numbers change.

Blowout Height. The minimum height or extent of foam expansion in a cavity that causes cavities walls to blow out from framing members. While it is referred to as a blowout "height," the term can also apply to a minimum width or total area of foam expansion in a cavity that causes a blowout.

Body Shot. A shot that dispenses the maximum height or extent of expansion of foam in a cavity that doesn't risk wall blowout. In general, the complete filling of a cavity with foam may require a plurality of body shots into the cavity.

Finishing shot. A shot that dispenses the height of foam required to fill the remainder of a cavity, or to finish filling the cavity, after all body shots are completed.

Lift. A series of intermittent shots in multiple cavities within a building structure all injected at the same hole height and in which the foam is expected to expand to the same height within each cavity. For example, the first lift rises to 28". The second lift rises to 56".

Safe Hole Height. The minimum, height of an injection hole in a cavity into which a body shot can be safely injected. For example, if a body shot is expected to inject a quantity of foam that rises to 28", an injection hole might be drilled in the cavity panel at a height of 16" in order to minimize blowout risk. In this example, 16" would be referred to as the safe hole height.

A first general aspect of the present invention is a method of filling a cavity with a foam-in-place insulation that is formed by a reaction of at least one precursor. The method includes:

(A) providing a foam dispensing system that includes:

at least one precursor vessel, each of the precursor vessels containing a current quantity of a corresponding one of the precursors, each of the precursor vessels further containing a gas located above the current quantity of the precursor in the precursor vessel, the gas having a gas pressure; and a precursor dispensing gun in liquid communication with the precursor vessels, the dispensing gun, when actuated by a user, being configured to concurrently dispense the precursors from the precursor vessels into the cavity, the precursors being caused to react immediately before, during, or after dispensing thereof into the cavity;

the foam dispensing system being self-contained, in that none of the precursor vessels is in fluid communication with any positive displacement flow meter or flow control valve, nor with any external apparatus that would be capable of modifying the gas pressure in the precursor vessel, or modulating a flow rate of the precursor as it is dispensed from the precursor vessel;

the foam dispensing system being configured such that when the at least one precursor vessel comprises a plurality of precursor vessels, and when the gas pressures in the precursor vessels are initialized to specified initial pressures that cause the precursors to be dispensed in the specified ratio, the precursors will continue to be dispensed in a specified ratio as the gas pressures within the precursor vessels decrease due to the dispensing of the precursors by the dispensing gun and the resulting quantity reductions of the precursors in the precursor vessels.

(B) for each of the precursor vessels, pre-calibrating a flow rate function characterizing a flow rate of the corresponding precursor from the precursor vessel as a function of a system parameter;

(C) pre-determining quantities of the precursors to be dispensed in the specified ratio during each of a plurality of counts, each count comprising equal quantities of the precursors to be dispensed;

(D) measuring a current value of the system parameter for each of the precursor vessels;

(E) according to the flow rate function and the quantities of the precursors to be dispensed in the specified ratio during each count, calculating a time duration of each count, referred to herein as a "count duration," as a function of the system parameter;

(F) determining a number of the counts, referred to herein as a "shot count," that will cause a pre-determined required volume of the precursors to be dispensed into the cavity during a shot;

(G) actuating of the injection gun by a user, thereby initiating the shot;

(H) announcing to the user a number of the counts that have elapsed since the injection gun was actuated by the user; and (I) Instructing the user to cease actuation of the injection gun and to thereby end the shot, when the elapsed number of counts is equal to the shot count.

In embodiments, in step (B), the system parameter is the current value of the gas pressure in the precursor vessel.

In any of the above embodiments, steps (D) through (I) can be repeated successively for each of a plurality of shots, each of the shots being dispensed into a corresponding one of a plurality of holes, the gas pressures within the precursor vessels being thereby decreased at the beginning of each of the successive shots. In some of these embodiments, the count duration is adjusted in compensation for the reduced gas pressures within the precursor vessels as steps (D) through (I) are repeated. and in any of these embodiments, the shot count can be adjusted in compensation for the reduced gas pressures within the precursor vessels as steps (D) through (I) are repeated.

In any of the above embodiments where the system parameter is the gas pressure within each of the precursor vessels, step (D) can include directly measuring the gas pressures within the precursor vessels. In some of these embodiments, calculating the count duration in step (E) comprises:

for each of the precursor vessels, pre-calibrating a secondary functional relationship between a secondary system parameter of the precursor vessels and the gas pressures within the precursor vessels;

for each of the precursor vessels, applying the pre-calibrated secondary functional relationship to a measured value of the secondary system parameter to determine the gas pressure in the precursor vessel; and applying the flow rate functions to the determined gas pressures.

In some of these embodiments, for each of the precursor vessels, the secondary system parameter is one of: a weight of the precursor vessel; a volume or level of the corresponding precursor in the precursor vessel; and a calculation of an aggregate quantity of the corresponding precursor that has been dispensed from the precursor vessel since the gas in the precursor vessel was most recently initialized to its specified initial pressure.

In any of the above embodiments, in step (H), announcing the number of elapsed counts to the user during the shot can include audibly announcing the number of elapsed counts to the user. In some of these embodiments, each of the audible announcements to the user comprises a speaking time and a pause time, the pause time being determined by subtracting the speaking time from the count duration.

In any of the above embodiments, in step (H), announcing the number of elapsed counts to the user during the shot can include visibly signaling the number of elapsed counts to the user.

In any of the above embodiments, in step (B), for each of the precursor vessels, the flow rate function can be pre-calibrated as a function of the gas pressure within the precursor vessel and a temperature of the precursor vessel;

in step (D), measuring current value of the system parameter of each of the precursor vessels can further include measuring the temperatures of the precursor vessels, and in step (E), calculating the count duration can include calculating the count duration as a function of the system parameter and the temperature of each of the precursor vessels.

In any of the above embodiments, in step (C), pre-determining the quantities of the precursors to be dispensed in the specified ratio during each of the plurality of counts can include:

determining a minimum quantity of foam that will cause a cavity panel of the cavity to blow out due to a single shot;

determining a maximum quantity of foam that can be dispensed while minimizing a risk of blow out due to a single shot;

for the minimum quantity of foam, assigning a quantity of foam per count such that the count will be preferably greater than 2; and for the maximum quantity of foam, assigning a quantity of foam per count such that the count will be preferably less than 20.

Some of these embodiments further include applying in-wall metering to the one or more cavities to determine the maximum quantity of foam.

In any of the above embodiments, in step B), for each of the precursor vessels, characterizing the precursor flow rate of the corresponding precursor from the precursor vessel as a function of the system parameter can include:

dispensing a plurality of quantities of the corresponding foam precursor into a plurality of platforms or containers according to a plurality of dispensing times and a plurality of values of the system parameter;

measuring the dispensed quantities of the precursor;

selecting a formula that is a function of the system parameter and the dispensing time; and adjusting coefficients of the formula until a best fit to the dispensed quantities is obtained.

In any of the above embodiments, the method can further include:

pre-calibrating a lag time correction factor that is a function of the system parameter and the shot time, the lag time correction factor being a positive or negative time increment that accounts for reduced flow rates of the precursors during a startup period of the shot, and extended flow rates of the precursors after a nominal end of the shot;

in step (B), for each of the precursor vessels, the flow rate function characterizes a flow rate of the corresponding precursor from the precursor vessel that will apply after the initial start-up period of the shot; and in step (F), determining the shot count that will cause the determined quantities of the precursors to be dispensed into the cavity during the shot comprises:

determining the lag time correction factor that will be applicable to the shot;

dividing the quantities of the precursors to be dispensed as determined in step (B) by the flow rate functions as determined in step B; and adding the lag time correction factor to the result of (II).

A second general aspect of the present invention is an apparatus suitable for applying foam-in-place insulation to a cavity. The apparatus includes:

a foam dispensing system comprising:

at least one precursor vessel, each of the precursor vessels containing a current quantity of a corresponding precursor, each of the precursor vessels further containing a gas located above the current quantity of the precursor in the precursor vessel, the gas having a gas pressure; and a precursor dispensing gun in liquid communication with the precursor vessels, the dispensing gun, when actuated by a user, being configured to concurrently dispense the precursors from the precursor vessels into the cavity, the precursors being thereby caused to react and to form the foam immediately before, during or after dispensing thereof into the cavity;

the foam dispensing system being self-contained, in that none of the precursor vessels is in fluid communication with any positive displacement flow meter or flow control valve, nor with any external apparatus that would be capable of modifying the gas pressure in the precursor vessel, or modulating a flow rate of the precursor as it is dispensed from the precursor vessel;

the foam dispensing system being configured such that when the at least one precursor vessel comprises a plurality of the precursor vessels, and when the gas pressures in the precursor vessels are initialized to specified initial pressures that cause the precursors to be dispensed in the specified ratio, the precursors will continue to be dispensed in a specified ratio as the gas pressures within the precursor vessels decrease due to the dispensing of the precursors by the dispensing gun and the resulting quantity reductions of the precursors in the precursor vessels; and a computing system configured to carry out the method of the first general aspect, wherein the foam dispensing system is provided in step (A).

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an insulation foam dispensing system that is localized, self-contained, and easily moved between injection sites within a building, and that provides reliable, and quantitatively accurate filling of cavities for shots of any length, without relying on positive displacement flow meters, flow control valves, or any external apparatus capable of modifying or regulating the pressures or flow rates within the precursor vessels.

Figure 1:
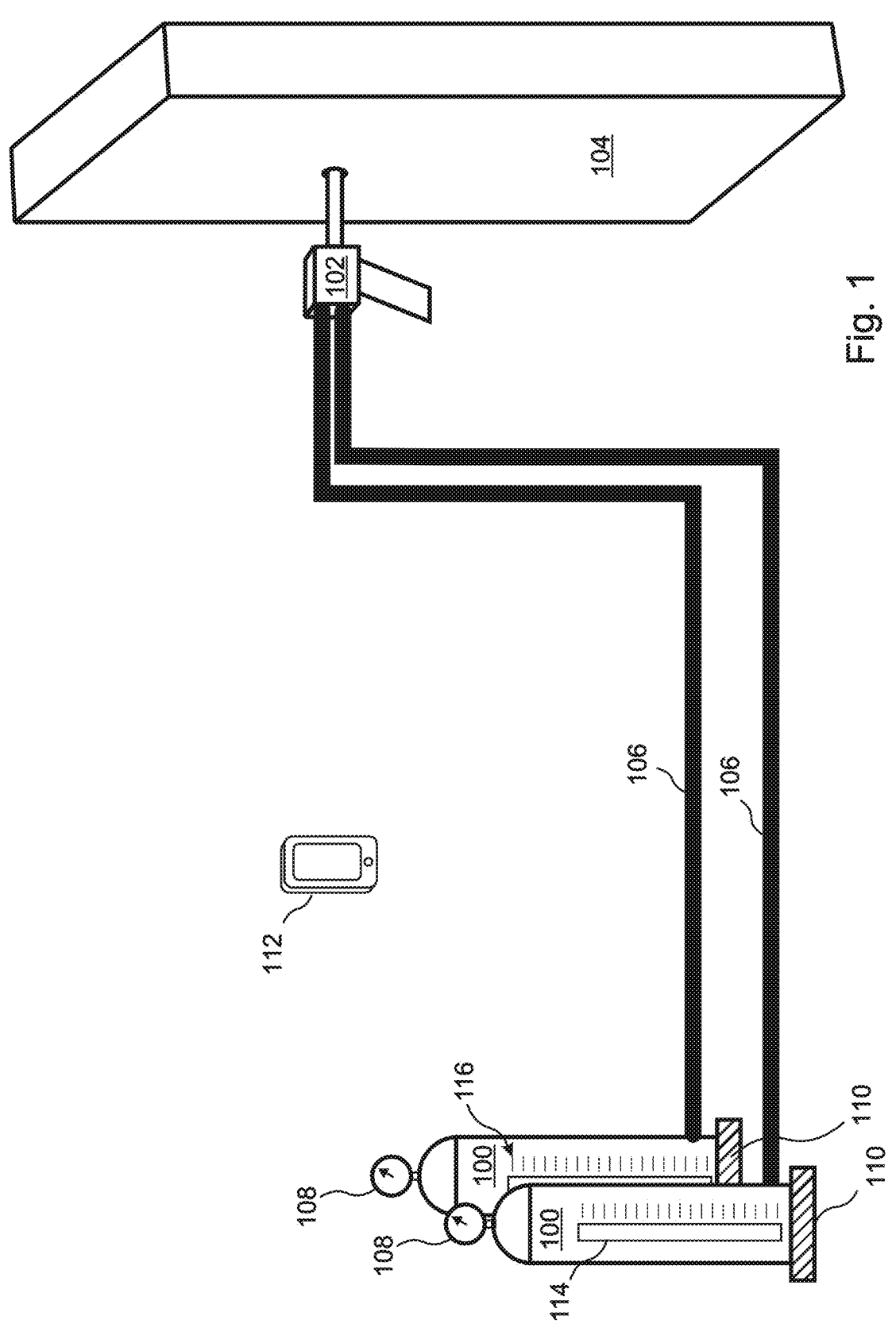
FIG. 1 is a simplified illustration of the components included in an embodiment of the present invention.

With reference to FIG. 1, the disclosed foam injection system comprises at least one pre-pressurized and pre-filled precursor vessel 100, at least one hose 106, and a cavity panel injection device 102, sometimes referred to herein as a "dispensing gun." It will be noted that the term "dispensing gun" 102 refers herein generically to any device, or arrangement of devices, that receives precursors from the precursor vessels 100 through the hoses 106, and injects the precursors through a cavity panel 104 into a cavity. In various embodiments, the dispensing gun 102 includes a valve, a mixer, and/or a dispensing needle, which can be configured according to the disclosure of U.S. Pat. No. 12,000,139, issued on Jun. 4, 2024, which is by the present Applicant and is incorporated herein by reference in its entirety for all purposes.

It should be noted that the term "hose," as used herein, refers to any device or arrangement of devices having a static internal geometry that conveys a precursor from a precursor vessel 100 to, and into, a dispensing gun 102, and that the term "hose," as used herein, includes any static internal structures within the dispensing gun 102 that convey a precursor, such as inner fluid conveying chambers within the dispensing gun 102. However, the term "hose," as used herein, does not include any structures having variable configurations, such as any valves that are included in the dispensing gun.

Each precursor vessel 100 is charged with an "initial pressure" of a gas, but is not otherwise in fluid communication with any apparatus capable of subsequent modifications to the initial pressure. Nor are the precursor vessels 100 in fluid communication with any fluid flow control valves or any other fluid flow system capable of modulating flow rate, other than on/off valves. If the precursor vessels 100 are disposable, these systems are commonly referred to as "kit foam." Refillable pressurized precursor vessels 100 can also be used.

In embodiments, each of the precursor vessels 100 includes at least one monitoring device capable of monitoring one or more system parameters. In some of these embodiments, the monitoring devices include one or more of a pressure sensor 108 that directly measures the pressure within the precursor vessel 100, a level sensor 114 that measures a precursor level within the precursor vessel 100, and/or a scale 110 that weighs the precursor vessel 100. Some embodiments further include temperature sensors (not shown) that monitor the temperatures of the precursors or the precursor vessels. However, positive displacement flow meters are not included in the disclosed system.

Readings made by these one or more monitoring devices 108, 114, 110 can presented visually to a user, and/or communicated directly to a controller or other computing device 112 through wired connections, wireless connections or visually to the user.

In embodiments, the computing device 112 is capable of receiving the monitored system parameters, performing calculations on the monitored system parameters, and providing output signals to a user. The computing device 112 can be a general-purpose computing device, such as a smartphone or laptop that may also be used for other purposes, or the computing device 112 can be dedicated to the disclosed apparatus. In various embodiments, information and/or prompts are presented to the user by the computing device itself 112, or by another device that may be physically separated from the computing device 112 and configured to receive outputs from the computing device 112, by wired, wireless or manual means. The information and/or prompts can be delivered to the user via a visual display and/or audio system. The audio system can present information to the user as comprehensible speech.

Because the disclosed system is self-contained, and is not tethered to a remote pump, compressed gas cylinder or compressor, the pressures of the gas or gases (air, nitrogen, or some other gas or gasses) within the precursor vessels 100 will decrease as the precursor materials are dispensed from the precursor vessels 100. As a result, the flow rates of the precursors are reduced as the precursors are expended from the precursor vessels 100.

Figure 2A:
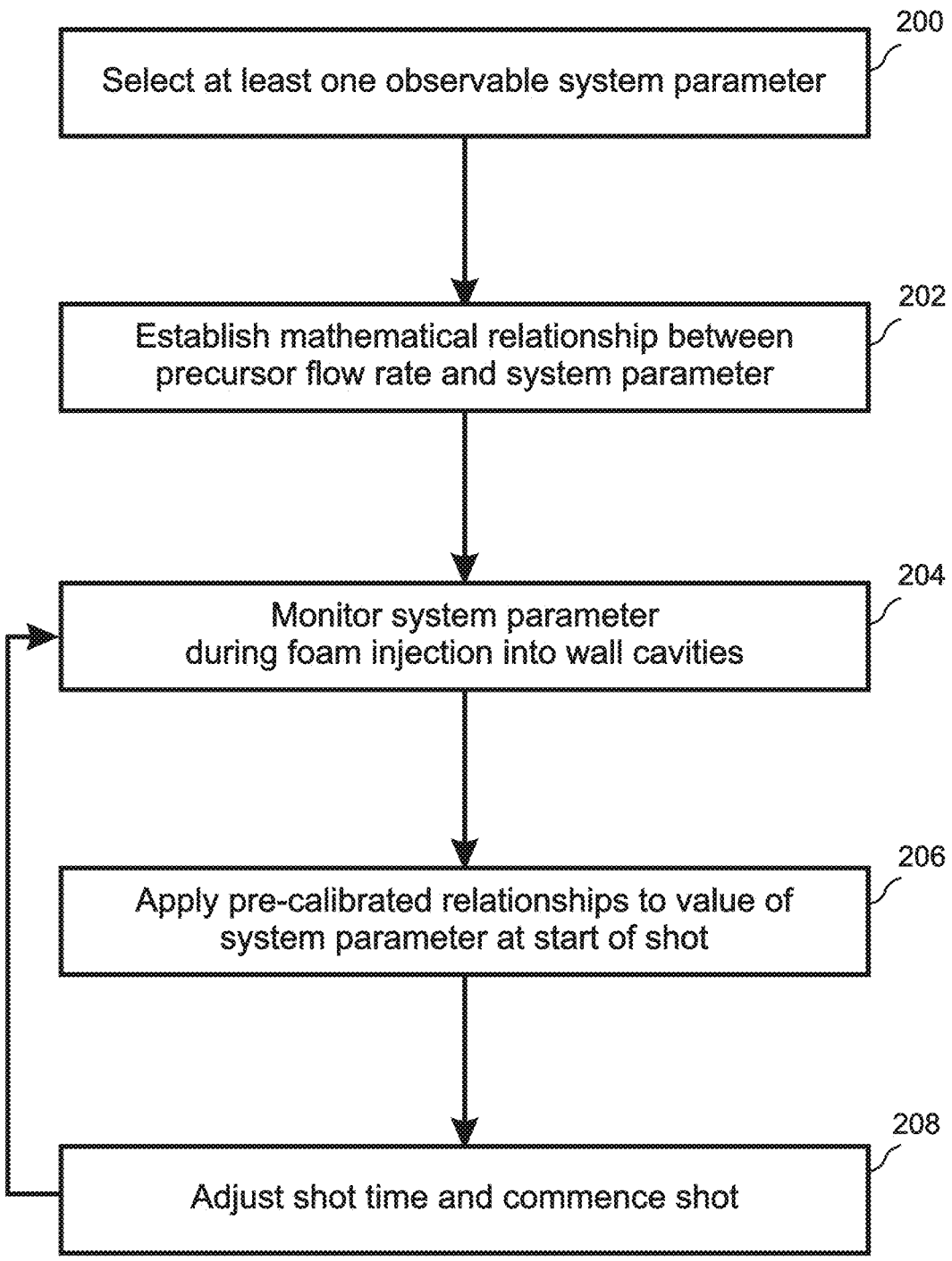
FIG. 2A is a flow diagram indicating steps included in an embodiment of the disclosed method.

With reference to FIG. 2A, the disclosed method comprises selecting at least one observable system parameter 200, and for each of the precursor vessels establishing an accurate mathematical relationship between precursor flow rate and the system parameter 202. Once this relationship is established 202, the flow rate of each precursor for each injection can be predicted by monitoring the system parameter during filling of a cavity 204, i.e. during and/or between precursor shots, thereby enabling the foam to be safely injected into the cavity without risking wall blowout. By applying the pre-calibrated mathematical relationship to the monitored system parameter at the start of each shot 206, it is then possible to predict the precursor flow rates of the next shot. The shot time and/or the count duration can then be adjusted before commencing the shot 208, so that a consistent quantity of the precursors is dispensed during each shot.

Figure 2B:
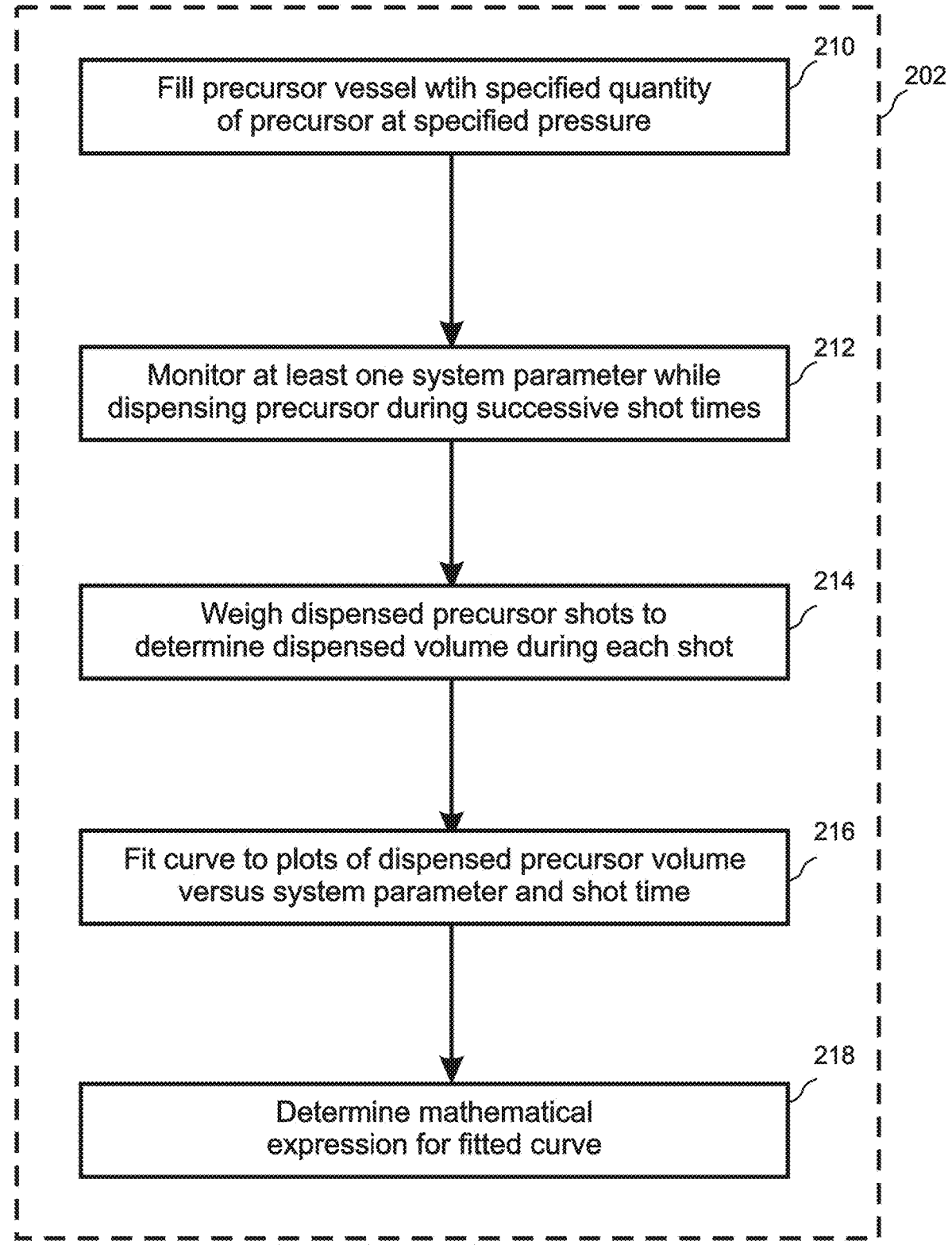
FIG. 2B is a flow diagram indicating sub-steps included in an embodiment of the present invention in one of the steps of FIG. 2A.

With reference to FIG. 2B, in embodiments, establishing an accurate mathematical relationship between a precursor flow rate and the system parameter 202 is performed "in the laboratory," i.e. not at the injection site, and can comprise filling a precursor vessel 100 with a specified quantity of precursor at a specified pressure 210, and then dispensing successive shots of the precursor during one or more specified shot times, with the selected system parameter(s), shot time(s), and, in embodiments, also the precursor temperature, being recorded at the beginning of each shot 212. The quantity of dispensed precursor for each shot is then determined, for example, by weighing the precursor "shots."

In some embodiments, each precursor vessel 100 is separately calibrated by dispensing precursor into a bucket or other container, and then weighing the container to determine the total amount of dispensed precursor. In other embodiments, the calibration measurements comprise dispensing all of the precursors simultaneously from their precursor vessels 100 during the successive shots, so that they are mixed and react to create foam. The shots of foam can be dispensed successively onto substantially flat, disposable targets, such as shallow trays or sheets of waxed paper or plastic, which can have pre-determined weights. This approach is sometimes referred to as "cow pie" calibration, because the resulting collection of foam deposits can be visually reminiscent of the "cow pies" that are typically deposited in cow pastures.

In embodiments, a "best fit" is established between a mathematical equation 218 and the data points that result from the calibration measurements 214. For example, a quadratic equation can be determined by a least-squares fit of a curve 216 to the calibration data.

In embodiments the precursor flow rates will depend primarily on the internal gas pressures within the precursor vessels. An example of a logarithmic formula relating precursor flow rate to internal pressure is presented in FIG. 3A. In some embodiments, the flow rate may also be affected by temperature fluctuations, while in other embodiments temperature fluctuations can be ignored.

In various embodiments, the gas pressure within each pressure vessel 100 is directly monitored as the system parameter, for example using pressure gauges 108. In other embodiments, the expected precursor flow rates are estimated according to one or more other "secondary" system parameters. Because the pressure reduction within a precursor vessel 100 will be a predictable function of the remaining quantity of precursor in the vessel 100, in embodiments the secondary system parameter is an indicator of the remaining precursor in the vessel. These can include changes in the weight of the vessel, changes in an observable precursor level in the vessel, and/or calculation of an aggregate quantity of precursor that has been dispensed from the vessel.

In embodiments, the duration of each shot, referred to herein as the "shot time," is controlled by implementing a "shot count" process whereby the shot is divided into a plurality of "counts," that are characterized by count parameters that include a "shot count" representing the total number of counts in the shot, and a count duration, representing the time duration of each count. In certain embodiments, the number of elapsed counts is presented to a user who actuates each shot, for example by verbally and/or visually presenting the count. The count can be an "up count," e.g. 1, 2, 3, etc. or a "down count," e.g. 5, 4, 3, 2, 1.

Variations in precursor flow rates are compensated in various embodiments by adjusting any combination of the shot count and count duration.

In some embodiments, an estimated average precursor flow rate is calculated in advance of each shot, and is used to determine the count parameters that will apply during the entire shot. In other embodiments, the calculation is repeatedly or continuously performed during each shot, and the count parameters are adjusted during the shot accordingly.

Figure 3A:
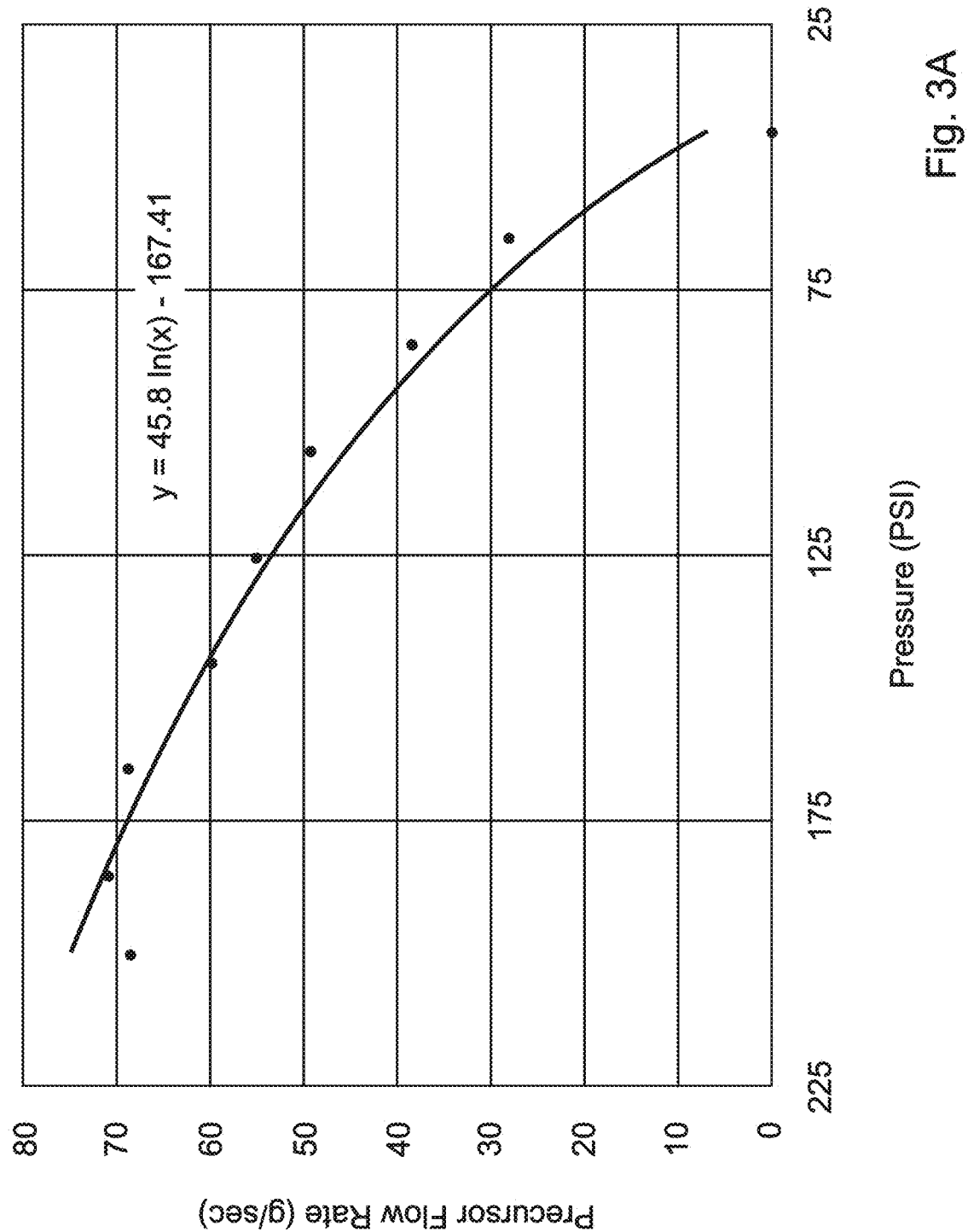
FIG. 3A is a graph indicating a calibrated relationship between a system parameter (pressure) and the precursor flow rate in an embodiment of the present invention.
Figure 3B:
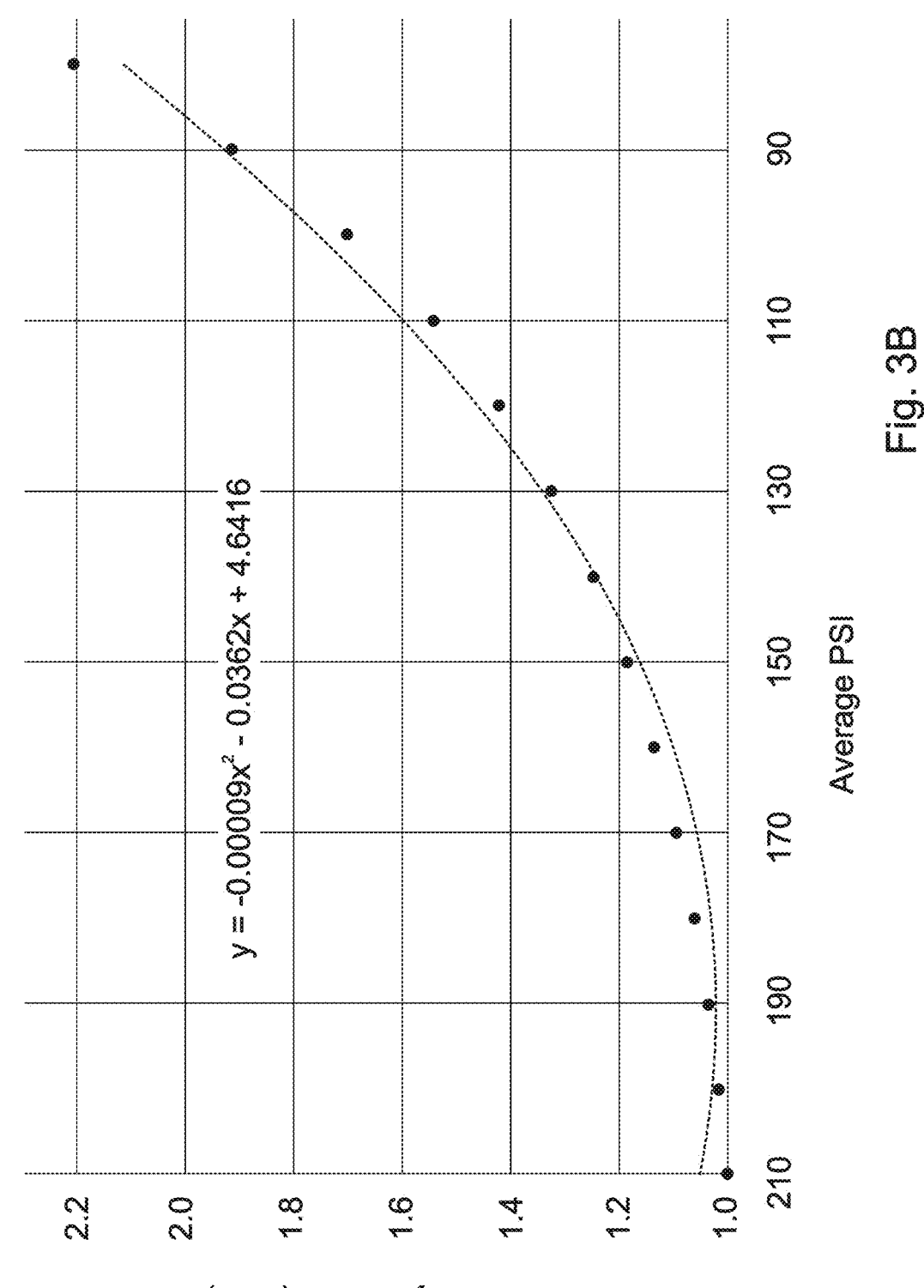
FIG. 3B is a graph indicating adjustment to the count as determined by applying the pre-calibrated relationship of FIG. 3A to the monitored system pressure according to an embodiment of the present invention.

In some embodiments, lag times are ignored. For each shot, according to this approach, determining the shot count requires merely determining the desired quantity of foam to be injected and the count duration, noting the current pressure in the precursor vessel, looking up the previously calibrated precursor flow rate as a function of the pressure, determining the quantity of precursor that will be dispensed during each count, and then dividing the quantity of foam to be injected by the determined quantity per count. FIG. 3B is a graph indicating an example where the count duration is adjusted as successive shots are applied and the average pressure for each shot is reduced.

In other embodiments, the shot count is specified a priori, thereby determining the quantity of precursor to be dispensed during each count according to the total quantity to be dispensed during the shot. The current pressure in the precursor vessel is measured, and the precursor flow rate function is applied to predict the precursor flow rate, from which the count duration can be calculated.

In other embodiments, lag times are taken into account when determining the count parameters. According to this approach, the lag times are predetermined as a function of the internal pressure in the precursor vessel, and the count parameters are adjusted accordingly. According to an exemplary embodiment, the count parameters are initially established without consideration of lag times, as described above. Then the count duration is adjusted by adding a lag time correction factor, also referred to as a "lagged count duration," to the shot time according to a predetermined mathematical relationship that relates the lag time and the internal pressure of the precursor vessel 100. An example of lag time measurement data and a quadratic equation that is fitted to the data is presented in FIG. 4.

In embodiments, the method disclosed herein employs five stages:

1. Predetermine a desired quantity of foam injection per count;
2. Predetermine a count duration equation, such that each count dispenses the same quantity of material even as the precursor vessel pressures and flow rates drop;
3. Predetermine a lagged count equation and adjust the count duration equation accordingly;
4. Calculate the number of counts to be included in each shot based on the blowout height; and
5. Inject the precursors into the cavity in successive intermittent shots, where each of the intermittent shots includes the calculated number of counts per shot.

Figure 7:
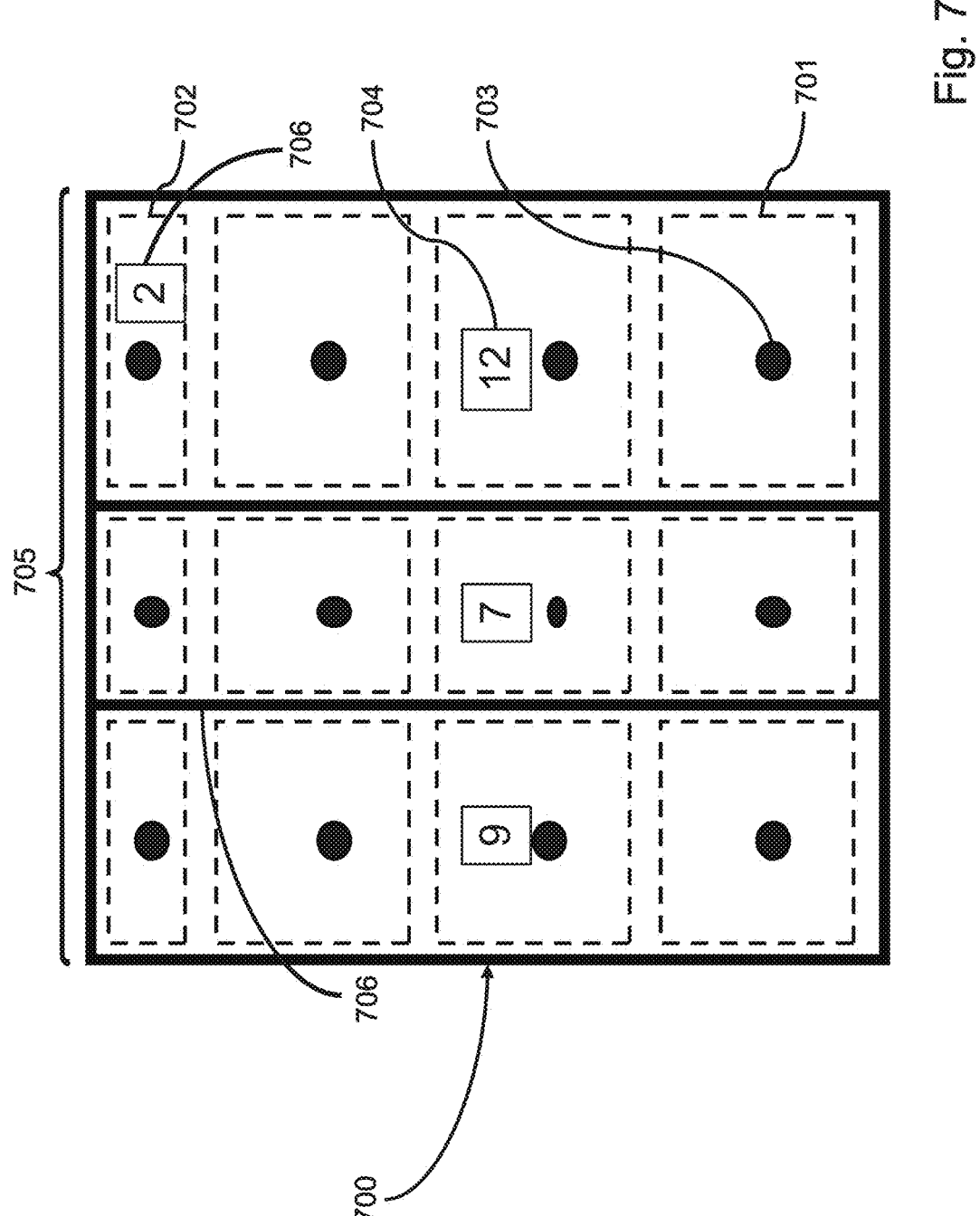
FIG. 7 illustrates a wall having cavities of various widths with varying body shot counts and finishing shot counts.

Each of these five stages can be composed of detailed steps as follows:

Stage 1: Predetermine quantity per count. The goal of this stage is to determine for any given precursors and cavity type, an appropriate quantity of dispensed foam per count. Stage 1 is typically completed in a laboratory or similar setting, and can include the following steps:

Step 1: Predetermine the blowout height, which is the foam fill height at which cavity blowout is likely to occur. With reference to FIG. 7, as precursor is dispensed into a cavity 700 it becomes a foam and expands between 5 and 100 times its dispensed volume. The amount of expansion depends primarily on the type of precursor and precursor and substrate temperatures.

In a laboratory setting, various precursors at various temperatures are injected into cavities of different depths to determine a maximum volume of foam that can be injected into a cavity before the cavity bows out or detaches from the framing members 706 due to excessive pressure build on cavity walls (referred to herein as "blowout"). Since wide cavities bow out more easily than narrow cavities, the widest cavity typically encountered in a building 705 is normally tested.

For instance, in a 22″ wide cavity with a depth of 3.5″, it has been found that approximately 1.5 cubic feet of a commonly used foam can be injected before wall blow out. Since the cavity width and depth are known and the rise height of the foam is easily measured, this foam can be said to have a "blowout height" of 35″ in a cavity of 3.5″ depth. Since shallower cavities create less pressure build, the same foam injected into a shallow cavity of 1″ might have a blowout height of 60″.

Step 2. Predetermine the body shot height, also referred to as the safe fill height, which is the maximum foam fill height at which cavity blowout risk is minimized. Even though narrower cavities will tend to have higher blowout heights than wide cavities of the same depth, for simplicity and improved throughput it is much easier to inject all cavities such that they fill to the same height. So once a blowout height has been established in a wide cavity, a body shot 704 will be established for cavities of all widths. In order to reduce the number of holes drilled in the wall, the body shot will be the maximum height that can be injected without excessive risk of wall blowout. This height can be determined experimentally but it typically later modified through extensive field experience. In general, a body shot is typically about ⅔ of blowout height.

Step 3. Predetermine a safe hole height, which is the height at which a hole can be drilled in the cavity in order to minimize blowout risk. The height of the hole within a safe fill height further influences blowout risk. For example, given a safe fill height of 28″, a hole drilled 2″ from the bottom of the cavity will cause significantly more pressure build on the lower portion of a cavity then a hole drilled at 16″ from the bottom of the cavity. This is because the foam will expand both downward and upward from the site of injection. The expansion of the foam from the hole drilled at 2″ will be constrained by the bottom of the cavity. With nowhere to go, it will build excessive pressure against the cavity wall, thereby increasing blowout risk.

Step 4. Assign a quantity of foam per count according to the body shot height. Once a body shot has been determined, a preliminary quantity per count can be assigned. In general, an attempt is made such that no count will be less than 2 or greater than 20 for a single shot in a standard building cavity. So, for example, if the narrowest 2×4 cavity that will be injected is 4″ and the body shot is 28″, the volume to be filled is 0.23 cubic feet. If one wanted to inject such a cavity with a 2 count, the quantity per count would be approximately 0.115 cubic feet. In a 2 lb per cubic foot density foam, this would equate to 0.23 lbs per count. If the widest cavity to be injected was 22″, this quantity per count of 0.23 lbs would equate to an 11 count. So, in this example, a quantity per count of 0.23 lbs/count would yield a minimum count of 2 and a maximum count of 11.

Stage 2: Predetermine the count duration equation. The goal of this stage is to derive a mathematical equation for determining a count duration, or time interval between the start of each count, such that each count provides precisely the same quantity of foam even as the precursor flow rates decline. In embodiments, Stage 2 is completed in a laboratory or similar setting according to the following steps:

Step 1. Predetermine a best fit equation that relates internal precursor vessel pressure to the precursor flow rate. In order to determine variable flow rates due to the drop in pressure as subsequent intermittent shots are dispensed, precursor is dispensed for a known amount of time at various known pressures in a laboratory setting. The shots of foam are dispensed onto substantially flat, disposable targets, such as sheets of waxed paper or plastic. The quantity of dispensed precursor for each shot is then determined by weighing the dispensed precursor. The flow rate as a function of the system parameter is determined by dividing the weight by the shot time.

The volume of the dispensed foam can then be calculated by multiplying the weight of the dispensed precursor by a pre-determined density of the foam. This approach is sometimes referred to as "cow pie" calibration, because the resulting collection of foam deposits can be visually reminiscent of the cow pies that are typically deposited in cow pastures. With reference to FIG. 3A, data points of pressure vs flow rate are then plotted on a graph and a best fit equation is established between the plotted points. So, for example, at a pressure of 100 psi, 200 grams of precursor might be dispensed in a 10 second shot for a flow rate of 20 grams/second. At 180 psi, 320 grams might be dispensed in a 10 second shot for a flow rate of 32 grams per second. A best fit equation that connects these and other similar data points might be $y = -0.0008x + 0.3958x - 13.209$ where $y =$ flow rate and $x =$ pressure.

Step 2. If the internal precursor vessel pressure will not be directly monitored, calibrate the internal precursor vessel pressure to at least one secondary system parameter, such as the weight of the precursor vessel, a measured height of the precursor in the vessel, and/or the aggregate quantity of precursor that has dispensed from the vessel since the precursor vessel was most recently filled and pressurized;

Other "secondary" system parameters that are directly related to precursor vessel pressure can be calibrated to the precursor flow rates. Secondary system parameters that are directly related to precursor vessel pressures can include precursor levels in the precursor vessels, weights of the precursor vessels, pressures at various points along the hoses, or pressures within the dispensing gun. Embodiments can also track the number and volume of cavities that have been previously filled from the same precursor vessel as a secondary system parameter. In some embodiments, these secondary system parameters are directly calibrated using the cow pie method outlined above. For instance, using a level sensor, when a precursor vessel is full, precursor flow rate might be 32 grams/second. When a precursor vessel is half full, the precursor flow rate might be 20 grams/second. In other embodiments, secondary system parameters are calibrated indirectly through their correlation with pressure, without making any cowpies or similar direct measurement. For instance, using a level sensor, when the precursor vessel is full, the pressure is 180 psi so therefore one would expect the precursor flow rate of 32 grams/second. When half full the pressure is 100, so one would expect a precursor flow rate of 20 grams/second.

Step 3. Under an assumption of uniform precursor flow rates during each count, derive a count duration equation which calculates the duration of each of the counts according to the quantity of foam to be dispensed in each count and the precursor flow rates, as determined from the precursor pressures.

With reference to FIG. 3B, once the desired quantity per count is known and the mathematical relationship between a system parameter and precursor flow rate is known, an equation for a variable count duration can be derived for pressure or any secondary parameter. For example, if the desired quantity per count is 0.10 lbs and a level indicator indicates a full precursor vessel and the calculated precursor flow rate is 0.05 lbs/second, then the count duration would be 1 count per 2 seconds. If the level indicator indicates a precursor vessel that is half full and the calculated precursor flow rate is 0.02 lbs per second, then the count duration would be 1 count per 5 seconds. A plot of system parameters vs count duration for any given quantity per count can be derived and a least-squares fit to the data can be used to determine a count duration equation.

Stage 3: Derive a lagged count equation that adjusts the count duration equation so that each count provides precisely the same quantity of foam even when the shot includes significant starting and/or ending lags. Stage 3 is typically completed in a laboratory or similar setting, and can include the following steps:

Step 1. Predetermine the starting and ending lag times that will be applicable to each shot, and the resulting change to the amount of precursor that will be dispensed during each shot, as compared to a hypothetical steady state shot. The lag times will generally be a function of the precursor vessel pressure.

It is important to recognize that the mathematical equation for count durations are derived from cowpie shots of relatively long duration, such as 10 seconds. During a 10 second shot, beginning and ending lag times have relatively little influence on overall shot quantity and almost all of the shot occurs during steady state flow. However, during short intermittent shots of 2 or 3 seconds, particularly short shots at high pressures, lag times can influence shot quantity by 50% or more. Accordingly, the disclosed method incorporates a "lagged count". The lagged count can be derived by first setting a system parameter to a specified value and then dispensing foam precursor for a specified shot time in an intermittent shot. The weight of the resulting cowpie is then measured.

The system parameter is then reset to the specified value and foam is dispensed in a steady state shot for the same specified shot time. The steady state shot can be obtained by dispensing precursor into a waste container for a period of time before the trigger on a dispensing gun is pulled and after it is released. The remaining precursor in the middle of the shot is dispensed in a cowpie for the specified time. The precursor that is dispensed in a steady state shot for the specified time thus doesn't include starting and ending lag times.

The difference between the weights of precursor dispensed during an intermittent shot and steady state shot can be used to calculate a lagged count duration. For example, assume the system parameter is a pressure set at 200 psi. If an intermittent shot produces 90 grams of dispensed material while the steady state shot produces 100 grams of material in a 10 second shot, the equation assuming a steady state flow rate will tend to underestimate the quantity that needs to be dispensed during an intermittent shot. In this example, a 1 second "lagged count" would need to be added to a shot count calculation of the intermittent shot to ensure that 100 grams of material are dispensed.

Figure 4:
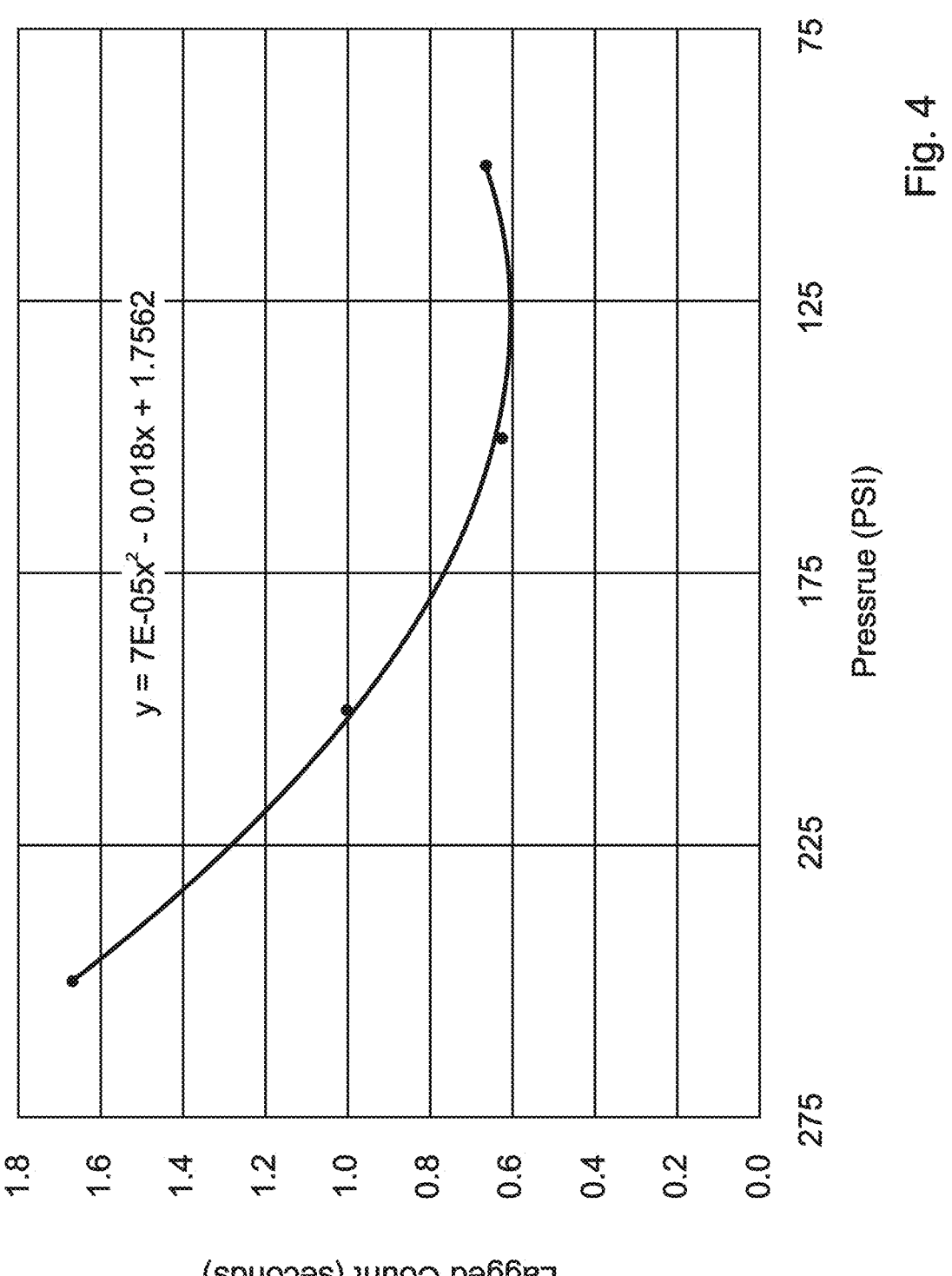
FIG. 4 is a graph illustrating an equation for a best fit line to calculate lagged counts vs. monitored system pressure.
Figure 5:
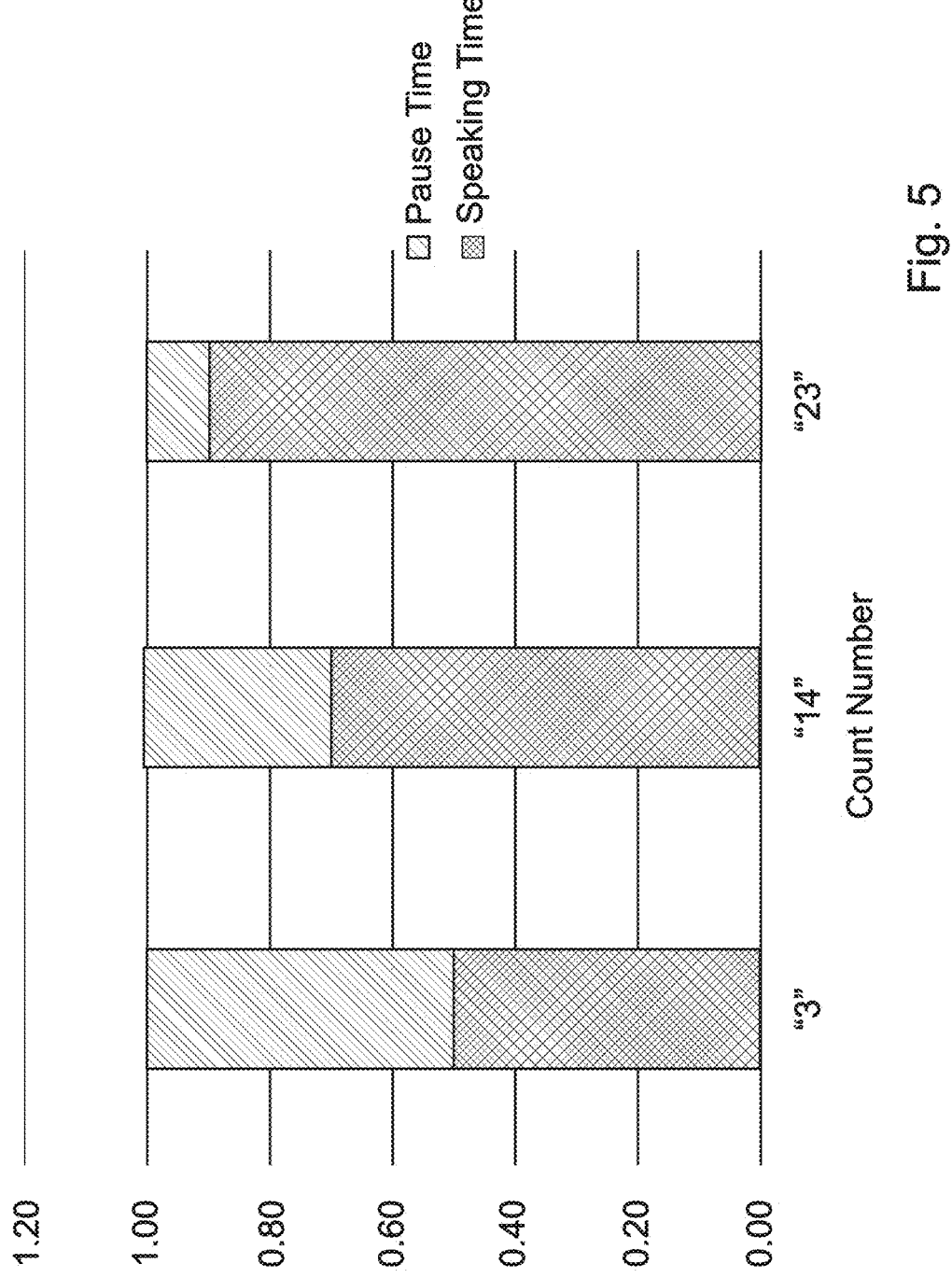
FIG. 5 is a bar graph that compares the difference in speaking times and pause times for three selected shot counts.

Step 2. Derive a lagged count equation, which is a best fit equation between at least one system parameter and the lag times. With reference to Table 1 below, the process of determining the difference between steady state shots and intermittent shots is repeated for multiple system parameters and recorded in a table. As will be noted, the lagged count duration is different for different system parameters. For example, a lagged count at 250 psi tends to be greater than a lagged count at 120 psi. With reference to FIG. 4, these data points are plotted on a graph and a best fit polynomial equation can be derived to determine a lagged count for any given system parameter.

TABLE 1

| Pressure (PSI) | Steady State Cowpie (grams) | Steady State Flow Rate (grams/second) | Intermittent Cowpie (grams) | Difference (grams) | Lagged count (seconds) |
|---|---|---|---|---|---|
| 100 | 60 | 6 | 56 | 4 | 0.7 |
| 150 | 80 | 8 | 75 | 5 | 0.6 |
| 200 | 100 | 10 | 90 | 10 | 1.0 |
| 250 | 120 | 12 | 100 | 20 | 1.7 |

Step 3. Add lagged count to count duration. Once a system parameter has been determined, both the count duration and lagged count can be calculated for the same parameter. If the system parameter for the count duration is 250 psi, the lagged count calculated for a system parameter of 250 psi would be added to the count duration equation.

Stage 4: Calculate counts per shot. The goal of stage 4 is to calculate the number of counts required per shot for cavities of any geometry. Stage 4 is conducted at a job site in a building, and comprises the following steps:

Step 1. Calculate fill height per count using a modified version of in-wall metering. As is described in U.S. patent application Ser. No. 15/251,783, filed on Aug. 30, 2016, incorporated herein by reference in its entirety for all purposes, a foam quantity required to fill a cavity to a known height is predetermined using a process called "in-wall metering." As described in the patent application, in wall metering assumes a constant fill rate to calculate dispense times for cavities of different geometries. For example, a 12" wide cavity might require 10 seconds to fill to a height of 28" while a 6" wide cavity will therefore take 5 seconds to fill to a height of 28". However, when precursor flow rates vary, fill rates also vary. Referring to the previous example, a 12" wide cavity might require 10 seconds to fill to a height of 28" at a precursor flow rate of 0.250 lbs/second. However, if the precursor flow rate has been reduced to 0.125 lbs/second, a 6" cavity might also require 10 seconds. The 5 second calculation derived from the assumption of a constant fill rate during in wall metering would be incorrect.

Therefore, to account for variable flow rates, the disclosed invention uses a count of quantities of foam rather than a count of time. Referring again to the previous example, to fill a 12" wide 2×4 cavity to 28" requires 0.68 cubic feet of foam. So, if predetermined quantity per count is 0.068 cubic feet, then it would require 10 counts to fill a 12" wide cavity to 28". Similarly, it would require 5 counts to fill a 6" wide cavity to 28". The number of counts is independent of whether the precursor flow rate is 0.250 lbs/second or 0.125 lbs/second or any other value. Since the desired quantity per count has been predetermined and the count duration has been predetermined such that every count dispenses the same quantity even with variable precursor flow rates, a fill height per count can be calculated for any cavity. To calculate fill height per count, a known number of counts is injected into a cavity of known width. Since foam exotherms once in the cavity, the height of the relatively warm foam can then be measured with an infrared camera. The fill height is then divided by the number of counts to derive the fill height per count for a cavity of known width. So, for example if a 10 count shot expands to a foam height of 30" in a 22" wide cavity, then the fill height per count is 3" per count.

Step 2. Calculate counts per shot for all cavities. Once a fill height per count for a cavity of known width is determined, and the body shot is known, the number of counts per shot can be determined for any cavity. So for example with reference to the previous example, if the body shot is 30" and the fill height per count in a 22" wide cavity is 3" per count and a new cavity width is half as wide at 11", then the number of counts for the 11" wide cavity to expand exactly to the Body Shot would be 5, or half the number of the 22" wide cavity. With reference to FIG. 8, the number of counts per shot is calculated by a computing device and written on a label 804 affixed to each cavity. As described above, these shots are typically referred to as "body shots" since they are used to fill the main body of the cavity with a minimum number of shots. "Finishing shots" are described below.

Stage 5: Fill all cavities in successive intermittent shots. The goal of stage 5 is to completely fill all the cavities with a minimum number of holes and with minimal blowout risk through a series of intermittent shots. Stage 5 is conducted at a job site in a building, and includes the following steps:

Step 1. Calculate maximum number of body shot lifts. With reference again to FIG. 7, given a known height of a cavity 700, the maximum number of vertically spaced body shots 701 can be determined by dividing the cavity height by the safe fill height. For example, a standard 96" inch wall cavity divided by 28" per body shot will yield 3 body shots with a remainder of 12". The remaining 12" will be filled in a finishing shot 702.

Step 2. Drill holes in lifts at a safe hole height. Given a predetermined body shot and safe hole height, a series of holes 703 is drilled in lifts in every cavity to be injected. For example, if the body shot is 28" and the safe hole height is 16", holes for the first lift are drilled at 16" while holes for the second lift are drilled at 28"+16"=44". To avoid measuring every hole using a ruler, users can apply masking tape or other markings to their bodies at the appropriate hole heights for each lift.

Step 3. Input monitored system parameter to a computing device. During the injection of foam into the cavities, the system parameter is monitored and the count duration and lagged count are adjusted by a computing device 112 for each shot according to the current value of the system parameter and the pre-calibrated relationship between system parameter values and dispensed foam quantities.

Step 4. Inject body shots by monitoring counts on an output device. The output device can be either a visual display, audio system or automatic control valve. In the case of an automatic control valve, the valve typically opens by having a user depress a trigger but then closes automatically after the correct number of counts has elapsed. In the case of a visual display, the number on the display changes in accordance with the count duration and lagged count.

However, during a series of intermittent shots, it can be difficult for a user to monitor a visual display while simultaneously monitoring the nozzle of the dispensing gun 102 that is inserted into the hole 803. Therefore, in embodiments, the count is provided by a hands-free audible system. In embodiments, the audible systems uses a count of numbers in comprehensible speech. However, with reference to FIG.

6, since it takes longer for an audible system to pronounce a 3-syllable number, such as "twenty-three," than a one syllable number, such as "three," and since the count duration is a predefined time interval based on a system parameter, each audible count will be composed of a different speaking time and pause time. The pause time will vary depending on the length of time required for speaking. For example, if the count duration is 1 count per 2 seconds and the count speaking time is 0.8 seconds, the count pause time will be 1.2 seconds. Referring to the same 1 count per 2 second count duration, if the count speaking time is 0.5 seconds, the count pause time will be 1.5 seconds.

Step 5. Calculate finishing shot counts. With reference again to FIG. 7, after all body shots 701 have been injected, and if there is a void at the top of the cavity 702 that must be filled, a finishing shot count 706 must be calculated. For any cavity with a known body shot count, the finishing shot count can be derived as a proportion of the body shot by measuring the height of the remaining void. For instance, if the body shot count is 6 and the body shot height is 30" and the void at the top of the cavity measures 10", then the finishing shot count would be 10"/30"*6=2.

Step 6. Inject remaining finishing shots. Cavities are labeled with calculated finishing shot counts, holes are drilled to access each void at the top of the cavity and the remaining finishing shots are injected in a series of intermittent shots to completely fill the cavity, since it takes longer for an audible system to pronounce a 3-syllable number, such as "twenty-three," than a one syllable number, such as "three," and since the count duration is a predefined time interval based on a system parameter, each audible count will be composed of a different speaking time and pause time. The pause time will vary depending on the length of time required for speaking. For example, if the count duration is 1 count per 2 seconds and the count speaking time is 0.8 seconds, the count pause time will be 1.2 seconds. Referring to the same 1 count per 2 second count duration, if the count speaking time is 0.5 seconds, the count pause time will be 1.5 seconds.

Figure 6:
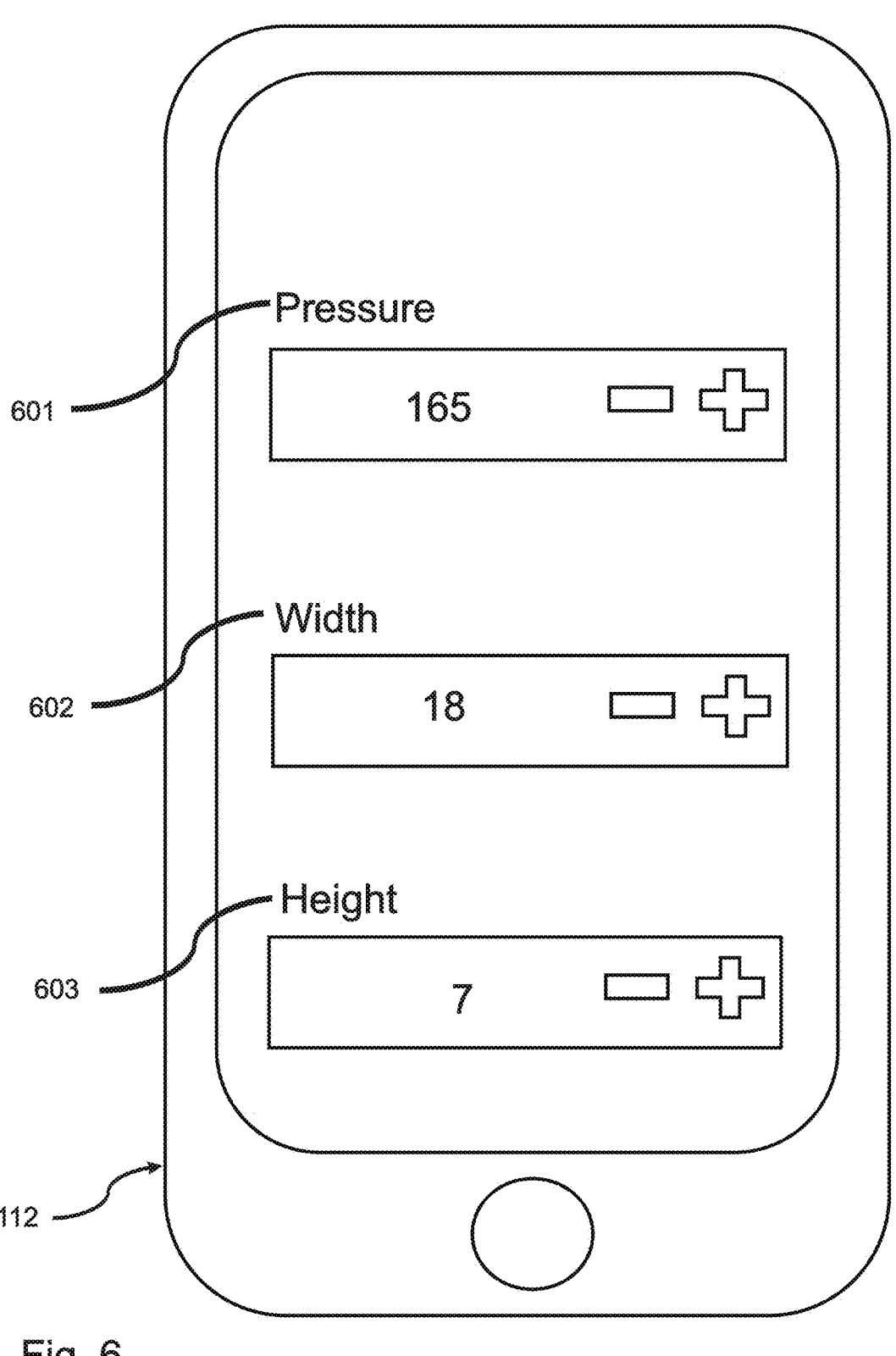
FIG. 6 illustrates a manual user input on a computing device such as a smartphone according to an embodiment of the present invention.

While it may appear that the number of calculations required of the user is onerous, with reference to FIG. 6 all calculations are typically performed by a programmed computing device 112 based on mathematical parameter relationships predetermined in the lab. At most, the user in the field needs to only manually enter two inputs into the program before starting a series of intermittent body shots: system parameter setting 601 and cavity width 602. In embodiments with automatic entry of system parameters, the user only needs to enter one input for body shots: cavity width. Finishing shots only require an additional manual input of void height 603.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of filling a cavity with a foam-in-place insulation that is formed by a reaction of at least one precursor, the method comprising:

(A) providing a foam dispensing system comprising:

at least one precursor vessel, each of the at least one precursor vessel containing a current quantity of a corresponding one of the at least one precursor, each of the at least one precursor vessel further containing a gas located above the current quantity of the at least one precursor in the at least one precursor vessel, the gas having a gas pressure; and a precursor dispensing gun in liquid communication with the at least one precursor vessel, the precursor dispensing gun, when actuated by a user, being configured to concurrently dispense the at least one precursor from the at least one precursor vessel into the cavity, the at least one precursor being caused to react immediately before, during, or after dispensing thereof into the cavity;

the foam dispensing system being self-contained, in that none of the at least one precursor vessel is in fluid communication with any positive displacement flow meter or flow control valve, nor with any external apparatus that would be capable of modifying the gas pressure in the at least one precursor vessel, or modulating a flow rate of the at least one precursor as it is dispensed from the at least one precursor vessel;

the foam dispensing system being configured such that when the at least one precursor vessel comprises a plurality of precursor vessels, and when the gas pressures in the at least one precursor vessel are initialized to specified initial pressures that cause the at least one precursor to be dispensed in a specified ratio, the at least one precursor will continue to be dispensed in a specified ratio as the gas pressures within the at least one precursor vessel decrease due to the dispensing of the at least one precursor by the dispensing gun and the resulting quantity reductions of the at least one precursor in the at least one precursor vessel;

(B) for each of the at least one precursor vessel, pre-calibrating a flow rate function characterizing a flow rate of the corresponding one of the at least one precursor from the at least one precursor vessel as a function of a system parameter;

(C) pre-determining quantities of the at least one precursor to be dispensed in the specified ratio during each of a plurality of counts, each count comprising equal quantities of the at least one precursor to be dispensed;

(D) measuring a current value of the system parameter for each of the at least one precursor vessel;

(E) according to the flow rate function and the quantities of the at least one precursor to be dispensed in the specified ratio during each count, calculating a time duration of each count, referred to herein as a "count duration," as a function of the system parameter;

(F) determining a number of the plurality of counts, referred to herein as a "shot count," that will cause a pre-determined required volume of the at least one precursor to be dispensed into the cavity during a shot;

(G) actuating of an injection gun by a user, thereby initiating the shot;

(H) announcing to the user a number of the plurality of counts that have elapsed since the injection gun was actuated by the user; and (I) instructing the user to cease actuation of the injection gun and to thereby end the shot, when the elapsed number of counts is equal to the shot count.

2. The method of claim 1, wherein in step (B) the system parameter is the current value of the gas pressure in the at least one precursor vessel.

3. The method of claim 1, wherein steps (D) through (I) are repeated successively for each of a plurality of shots, each of the plurality of shots being dispensed into a corresponding one of a plurality of holes, the gas pressures within the at least one precursor vessel being thereby decreased at the beginning of each of the successive shots.

4. The method of claim 3, wherein the count duration is adjusted in compensation for the reduced gas pressures within the at least one precursor vessel as steps (D) through (I) are repeated.

5. The method of claim 3, wherein the shot count is adjusted in compensation for the reduced gas pressures within the at least one precursor vessel as steps (D) through (I) are repeated.

6. The method of claim 1, wherein the system parameter is the gas pressure within each of the at least one precursor vessel, and wherein step (D) comprises directly measuring the gas pressures within the at least one precursor vessel.

7. The method of claim 6, wherein the system parameter is the gas pressure within each of the at least one precursor vessel, and wherein calculating the count duration in step (E) comprises:

for each of the at least one precursor vessel, pre-calibrating a secondary functional relationship between a secondary system parameter of the at least one precursor vessel and the gas pressures within the at least one precursor vessel;

for each of the at least one precursor vessel, applying the pre-calibrated secondary functional relationship to a measured value of the secondary system parameter to determine the gas pressure in the at least one precursor vessel; and applying the flow rate functions to the determined gas pressures.

8. The method of claim 7, wherein for each of the at least one precursor vessel, the secondary system parameter is one of:

a weight of the at least one precursor vessel;

a volume or level of the corresponding precursor in the at least one precursor vessel; and a calculation of an aggregate quantity of the corresponding one of the at least one precursor that has been dispensed from the at least one precursor vessel since the gas in the at least one precursor vessel was most recently initialized to its specified initial pressure.

9. The method of claim 1, wherein in step (H), announcing the number of elapsed counts to the user during the shot comprises audibly announcing the number of elapsed counts to the user.

10. The method of claim 9, wherein each of the audible announcements to the user comprises a speaking time and a pause time, the pause time being determined by subtracting the speaking time from the count duration.

11. The method of claim 1, wherein in step (H) announcing the number of elapsed counts to the user during the shot comprises visibly signaling the number of elapsed counts to the user.

12. The method of claim 1, wherein:

in step (B), for each of the at least one precursor vessel, the flow rate function is pre-calibrated as a function of the gas pressure within the at least one precursor vessel and a temperature of the at least one precursor vessel;

in step (D), measuring current value of the system parameter of each of the at least one precursor vessel further comprises measuring the temperatures of the at least one precursor vessel, and in step (E), calculating the count duration comprises calculating the count duration as a function of the system parameter and the temperature of each of the at least one precursor vessel.

13. The method of claim 1, wherein, in step (C), predetermining the quantities of the at least one precursor to be dispensed in the specified ratio during each of the plurality of counts comprises:

determining a minimum quantity of foam that will cause a cavity panel of the cavity to blow out due to a single shot;

determining a maximum quantity of foam that can be dispensed while minimizing a risk of blow out due to a single shot;

for the minimum quantity of foam, assigning a quantity of foam per count such that the count will be preferably greater than 2; and for the maximum quantity of foam, assigning a quantity of foam per count such that the count will be preferably less than 20.

14. The method of claim 13, further comprising applying in-wall metering to the cavity to determine the maximum quantity of foam.

15. The method of claim 1, wherein in step B), for each of the at least one precursor vessel, characterizing the at least one precursor flow rate of the corresponding one of the at least one precursor from the at least one precursor vessel as a function of the system parameter comprises:

dispensing a plurality of quantities of corresponding foam precursor into a plurality of platforms or containers according to a plurality of dispensing times and a plurality of values of the system parameter;

measuring the dispensed plurality of quantities of the at least one precursor;

selecting a formula that is a function of the system parameter and the plurality of dispensing time; and adjusting coefficients of the formula until a best fit to the dispensed plurality of quantities is obtained.

16. The method of claim 1, wherein:

the method further comprises pre-calibrating a lag time correction factor that is a function of the system parameter and a time duration of the shot, the lag time correction factor being a positive or negative time increment that accounts for reduced flow rates of the at least one precursor during a startup period of the shot, and extended flow rates of the at least one precursor after a nominal end of the shot;

in step (B), for each of the at least one precursor vessel, the flow rate function characterizes a flow rate of the corresponding one of the at least one precursor from the at least one precursor vessel that will apply after an initial start-up period of the shot; and in step (F), determining the shot count that will cause the pre-determined quantities of the at least one precursor to be dispensed into the cavity during the shot comprises:

(I) determining the lag time correction factor that will be applicable to the shot;

(II) dividing the quantities of the at least one precursor to be dispensed as determined in step (B) by the flow rate functions as determined in step B; and (III) adding the lag time correction factor to the result of (II).

* * * * *